Patented Oct. 29, 1940

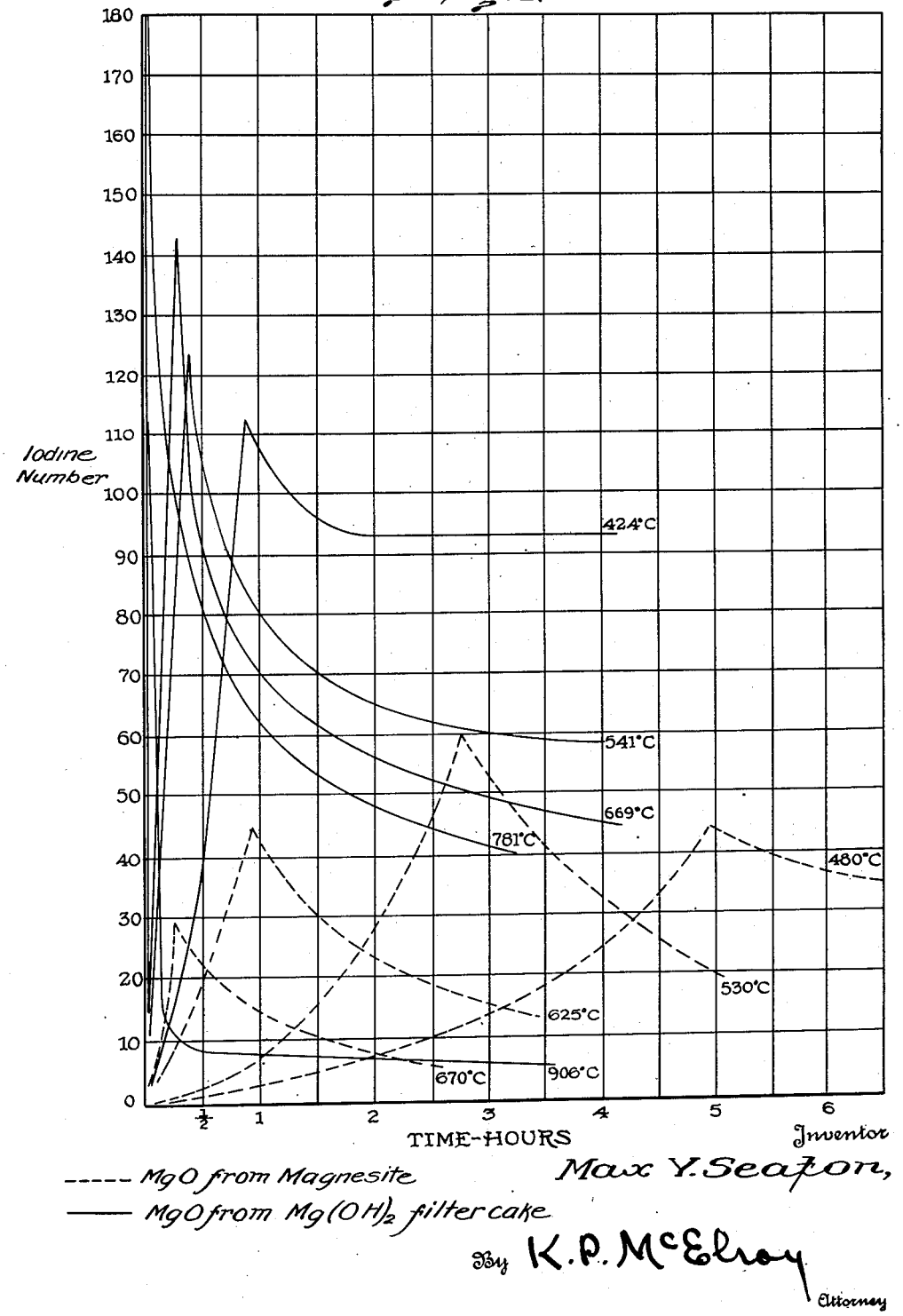

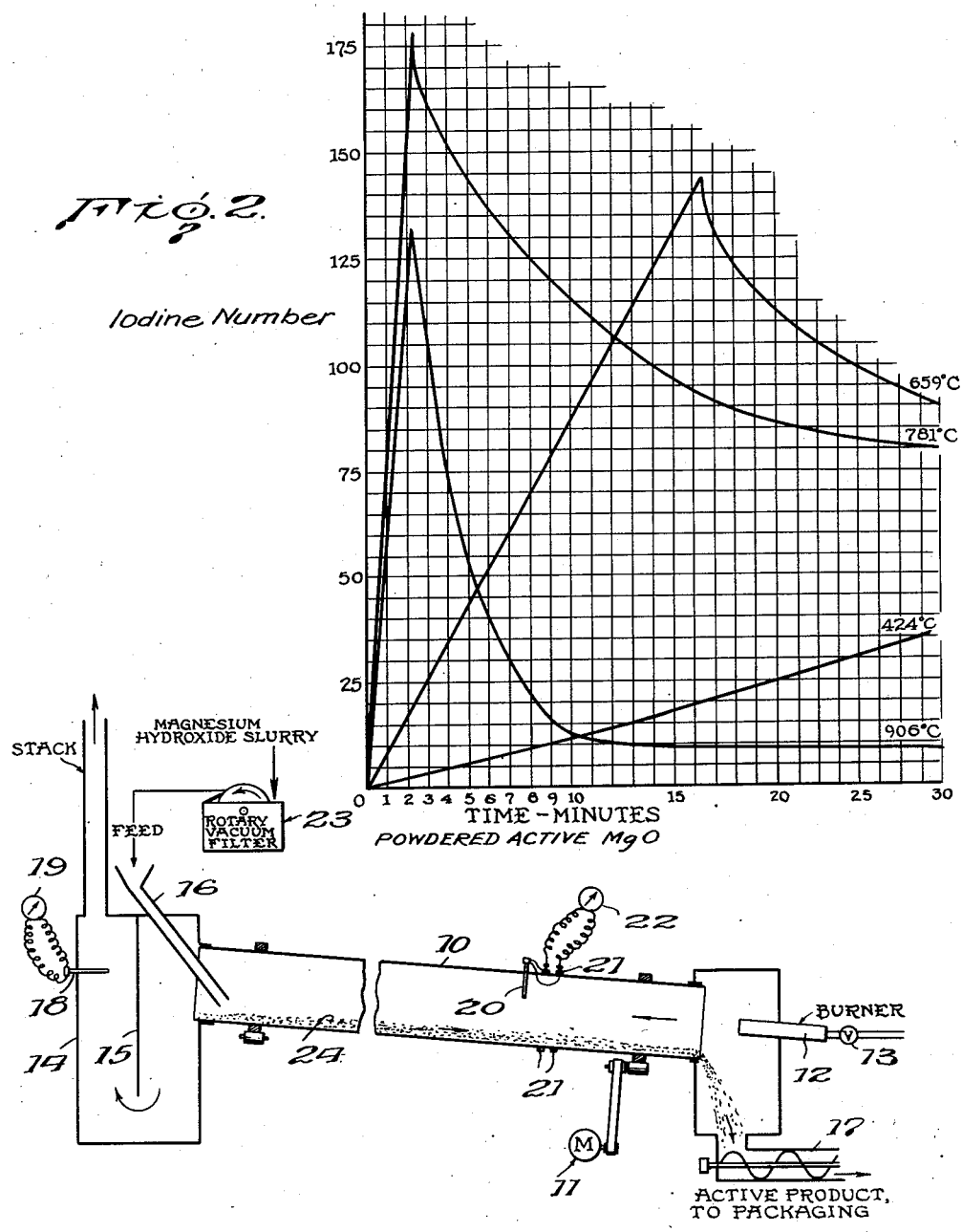

2,219,726

UNITED STATES PATENT OFFICE 2,219,726

ACTIVATED MAGNESIA AND METHOD OF MAKING

Max Y. Seaton, Greenwich, Conn., assignor to Westvaco Chlorine Products Corporation, New York, N. Y., a corporation of Delaware Application January 6, 1940, Serial No. 312,779

14 Claims. (Cl. 252—2)

This invention or discovery relates to activated magnesia and methods of making; and it comprises an active form of magnesia having adsorbent powers greater than those of either anhydrous or hydrated magnesia and representing a substantially unshrunk dehydrated magnesium hydroxide; and it also comprises a method of making such a material wherein $H_2O$ is expelled from hydrated magnesia by heat in a current of hot gases until the adsorbent power reaches a desired value as shown by adsorption of iodine from carbon tetrachloride solution, and wherein the magnesia is then cooled and packaged; all as more fully hereinafter set forth and as claimed.

In certain prior applications whereof the present application is a continuation-in-part, I have described and claimed the manufacture of activated magnesia as a new adsorbent material having an activity comparable with, or exceeding, that of commercial decolorizing carbons; said material being made by the careful removal of $H_2O$ from hydrated magnesia (magnesium hydroxide). These prior applications are as follows, the later being continuations-in-part of the earlier: Serial No. 703,935, filed Dec. 26, 1933; Serial No. 26,005, filed June 11, 1935; Serial No. 26,006, filed June 11, 1935; Serial No. 81,654, filed May 25, 1936; and Serial No. 104,231, filed Oct. 6, 1936.

Both hydrated magnesia and anhydrous magnesia in their usual forms have some adsorbent power but not sufficient for commercial purposes in competition with good adsorbents. I have, however, discovered that by methodically dehydrating magnesium hydrate by baking in a current of air or inert gases under controlled conditions I can produce a new type of adsorbent material; what may be called activated magnesia. Chemically, it is often largely MgO but the original particle or grain of hydrated magnesia $Mg(OH)_2$ persists physically, substantially without change in volume. Activated magnesia has a greater adsorbent power than boneblack and the earthy adsorbents largely used in the mineral oil industry; alumina (bauxite), fuller's earth, bentonite, etc., etc. Its adsorbent powers for many coloring matters are comparable with, and can be made considerably greater than, those of the standard commercial decolorizing carbons, over which it also has the further advantage of being white.

Activated magnesia is useful in decolorizing and purifying many non-aqueous liquids. In liquids containing water it tends to revert to ordinary hydrated magnesia.

Magnesium hydrate or magnesium hydroxide, $Mg(OH)_2$, retains its water of combination and does not dissociate below about 350° C. The vapor tension of $H_2O$ becomes significant at that temperature and above. In baking hydrated magnesia, the loss of water depends upon time, temperature and the $H_2O$ partial pressure in the atmosphere in contact with the magnesia. In heating there are two actions which can take place, one being the loss of water and the other being a shrinking action. Dehydration is antecedent to shrinkage and the shrinking action is not very rapid at temperatures below 450° C. In a general way the greater the amount of water removed, the greater is the adsorptive power of the product, shrinkage being equal.

Magnesium hydrate about 31 per cent of combined $H_2O$, or about 45 pounds $H_2O$ for every 100 pounds MgO. With complete dehydration 145 pounds of $Mg(OH)_2$ become 100 pounds of MgO. In the present invention the best products are made by carrying the dehydration not quite so far; by leaving a little residual $H_2O$ as a sort of factor of safety against shrinkage. The product advantageously contains an amount of $H_2O$ corresponding to at least about 2 per cent residual $Mg(OH)_2$; 100 pounds of such product may be considered, for analytical purposes, as containing 2 pounds $Mg(OH)_2$ and 98 pounds MgO, plus traces of impurities if present. This corresponds to about 0.6 pounds $H_2O$ in 100 pounds of the product as it leaves the kiln.

Often I adjust conditions so that the product contains substantially more $H_2O$. Products containing $H_2O$ in amount corresponding to 10 per cent $Mg(OH)_2$ and 90 per cent MgO are especially good. This proportion amounts to about 3 pounds $H_2O$ in 100 pounds of the material leaving the kiln. Activated magnesias in which 80 to 85 per cent of the original $Mg(OH)_2$ have been converted to MgO are also good. In making a product in which 80 per cent of the original $Mg(OH)_2$ has been converted to MgO, 145 pounds $Mg(OH)_2$ yield on dehydration 109 pounds of a product which may be regarded for analytical purposes as composed of 80 pounds MgO and 29 pounds $Mg(OH)_2$. This product contains about 9 pounds of water, or about 8 pounds water for each 100 pounds of the product. I have obtained excellent activated magnesias which contain as much as 80 per cent residual $Mg(OH)_2$; corresponding to about 25 pounds $H_2O$ in 100 pounds of the product.

It is not known in just what state the residual $H_2O$ exists in the activated product. Perhaps the product contains both MgO and Mg(OH)$_2$ in some form of association. It is a curious detail that sometimes the adsorbent power is markedly increased by allowing a small reabsorption of water vapor by the baked material. In dehydrating magnesia without shrinkage the product is more or less micro-cellular; there are, so to speak, molecular holes or porosities where the H$_2$O molecule is removed. These are probably responsible for adsorption.

For most commercial purposes high adsorbent power is required. The adsorbent power can be adjudged by treatment of colored oils, but there is so much observational error that I find it better to base the test on adsorption of iodine from a carbon tetrachloride solution, using a solution of iodine in pure carbon tetrachloride, advantageously of about 0.5 N concentration. Enough of the iodine solution is provided, relative to the quantity of material being tested, so that abstraction of iodine from the solution makes only a negligible change in the concentration. A specimen of the material is shaken with the iodine solution under standardized agitation conditions for a fixed length of time. The amount taken up by a gram of material under these conditions can be determined by titrating the solution; and from this the iodine value can be calculated. I generally use as the iodine value the millimolecules (0.127 grams) of iodine taken up by a gram of material, multiplied by 100. As a matter of coincidence, one very good grade of commercial decolorizing carbon has an iodine value of 100; that is, one gram of such material will take up about 0.127 grams of iodine. Iodine values of 60 or greater meet most commercial requirements. Ordinary dehydrated bauxite, fuller's earth, etc., etc., have values far below 60 on this scale. The best active Al$_2$O$_3$ has a value of 17, and the best active magnesia made by direct calcination of magnesite has an iodine value of only 55. By the present invention, activated magnesias can be made on a commercial scale with iodine values of 145 or better.

There are, as stated, many variables in the dehydration of hydrated magnesia. One important variable is the concentration of H$_2$O in the atmosphere with which the magnesia is in contact during the baking or dehydration. Other important variables are time and temperature, which have a determinable (and generally reciprocal) relationship. The effects of these variables, and the operation of the invention, will be further discussed with reference to the accompanying drawings, in which:

Fig. 1 represents graphically the relations between time, temperature and iodine number in dehydrating magnesia, the atmosphere being considered constant; with comparative data for calcining magnesite;

Fig. 2 reproduces a portion of the graph of Fig. 1 to an enlarged scale; and

Fig. 3 shows diagrammatically one type of apparatus suitable for use in practicing the present invention.

In the graph of Fig. 1, the abscissae represent time and the ordinates iodine number. Curves in solid lines show the iodine number of samples of magnesium hydroxide heated for various periods in a muffle furnace at five different temperatures. The atmosphere is presumed to be constant throughout these tests. The higher dehydration temperatures make for products of higher iodine numbers; but in employing the higher temperatures the heating time is critical. At 781° C. for instance, the highest iodine number is obtained when the hydrated magnesia is given a flash baking of 2½ minutes. When lower temperatures are employed, the heating time is not so critical.

Curves for magnesite, heated in a muffle furnace under comparable conditions, are indicated in dotted lines in Fig. 1 for the sake of comparison. It is readily observed from these curves that the iodine values (adsorbent capacities) of magnesias prepared in this manner are greatly inferior to those of the activated products of this invention.

Fig. 2 shows the left-hand portion of several curves from the graph of Fig. 1, but with an expanded abscissae scale, and shows more clearly the characteristics of the curves. It will be observed that the curves have rather pronounced maxima. This corresponds to the observed fact that in general a product of a given iodine number (below the maximum) can be obtained by employing either of two different baking times. For example, with a heating temperature of 659° C., an iodine number of 100 is obtained with a heat-treating time of 11.5 minutes or one of 25 minutes. However, the maximum iodine value of 144 is only obtained by heating at 659° C. for 16.5 minutes, followed by rapid cooling. It appears that, after the maximum adsorbent power is attained, shrinkage resulting from continued exposure to high temperatures tends to reduce it.

The curves of Figs. 1 and 2 indicate a fairly definite relationship between the time and temperature required to produce products of maximum activity, in accordance with this invention. This relationship may be expressed mathematically as follows:

Log time (minutes) = 3.7(0.00271 × °K.)

wherein °K. is the temperature in degrees Kelvin (=°C. absolute). It is assumed of course that a temperature sufficiently high to produce the requisite dehydration is employed; such temperature being at least 350° C. and usually above 400° C. The stated relation was determined by numerous tests in a muffle furnace, but is generally applicable if the constants are replaced by other values dependent on the particular equipment employed for the dehydration. In kiln operations the relations of time, temperature, atmosphere, etc., are empirical; but the above-stated relation is applicable on a qualitative basis, at least.

Kiln operations are the most convenient method of producing my improved activated magnesia on a commercial scale, and I have found that they can be conducted in such a manner that material of any given quality (iodine value) can be reproducibly made. In such operations, hydrated magnesia in suitable form is fed into the upper end of a rotary inclined kiln and passed downward through the kiln against a counterflow of hot flame gases. The hydrated magnesia may be in the form of a press-cake or slurry, and may be made up of freshly precipitated hydroxide, or from the hydrate produced by rehydrating magnesium oxide obtained by calcining magnesium carbonate in granular form, for example. In any event, operation of the kiln is conveniently regulated by observing the temperature at one selected point in the kiln, all other conditions being kept constant. It has been found that when the temperature at an appropriate point in the kiln is kept constant, and all other conditions are kept constant, a material of a certain iodine number can be regularly obtained; and that the iodine number of the product can be varied by varying the temperature at the specified point.

In general, it is desirable to operate in such a manner that the maximum temperature to which the magnesia is subjected is relatively low, and so that the time at maximum temperature is relatively short. Prolonged heating at high temperatures or localized overheating tend to produce a more dense product. And in general, anything which increases the density of the product detracts from its adsorbent characteristics.

Fig. 3 shows one convenient type of apparatus for large scale operations in accordance with this invention. An inclined rotary kiln 10, which in typical cases may be 170 feet long and 5½ to 10 feet in diameter, is turned by a motor 10. A gas burner 12 controlled by a valve 13 directs a long flame (not shown) into the kiln. The flame itself may extend 10 or 20 feet into the kiln. Beyond such distance the flame merges into heated exhaust gases. An exhaust chest 14, advantageously provided with a depending baffle 15 for dust separation, communicates with the other end of the kiln and receives the exhaust gases therefrom, discharging them to a stack.

A filter cake or slurry of hydrated magnesia is fed into the upper end of the kiln through a hopper or other suitable feeding means 16, and the active, partially dehydrated product is discharged from the lower end of the kiln and withdrawn, as by a conveyor 17. A thermocouple pyrometer 18 is advantageously provided in the exhaust chest to indicate stack gas temperatures, and connected to a galvanometer 19. Thermocouple pyrometer 20, located as described below, is provided within the rotary kiln and is connected through collector rings 21, or in some other suitable manner, with a galvanometer 22.

In one type of operation, a magnesium hydroxide slurry is fed to a rotary vacuum filter 23 and the filter cake, usually containing between 35 and 40 per cent solids (60 to 65 per cent water), is fed directly to the kiln as shown. The damp cake passes down the kiln as indicated at 24 and is baked. Moisture is progressively driven off. The temperature registered by thermocouple 20 is observed, and after conditions have been stabilized, is kept constant. In a typical 170-foot kiln, the optimum location of thermocouple 20 is about 40 feet from the discharge end of the kiln. This location gives the most critical relation between the characteristics of the product and the observed kiln temperature. The stack gas temperature is also watched (at 19). Should the kiln temperature fall below the best value, the rotary speed of the kiln is cut down, or the fuel feed is increased, or both. Converse steps are taken if the kiln temperature rises above the desired value. For kilns of the dimensions indicated, the temperature at pyrometer 20 will often lie in the range from 600° to 700° C.

In one typical operation with the apparatus described, the activated magnesia product issuing from the kiln has an iodine number of about 60 and contains about 10 parts H2O per 100 parts MgO. Products of higher adsorbent value (and iodine number) can be obtained by similar operations, with the kiln conditions suitably adjusted.

While, as noted, adsorbent materials having iodine numbers higher than 60 can be made in the large kilns previously described, it is usually best to employ a smaller kiln for this purpose. For example, a rotary kiln 20 feet long and having an inside diameter of about 16 inches gives good results. This kiln is advantageously fed with a slurry of magnesium hydrate containing about 75 to 80 per cent of water. During operation of the kiln, a metallic cage is suspended from a chain about one-third of the way down from the feed end, in such a manner that the cage rolls with the descending charge and breaks up any lumps present or formed therein. The dehydration of the magnesia in this kiln is usually so regulated that the product contains from 6 to 15 parts of water per 100 parts of MgO. More specifically, the dehydration of the product is adjusted within the specified range in accordance with the iodine number desired, and in accordance with the further specification that the product is to be on the over-burned side, or the under-burned side, with respect to the iodine number peak. (See Fig. 1.)

As in the case of the larger kilns previously described, these smaller kilns are readily controlled by maintaining a substantially fixed temperature at a certain point in the kiln. For example, it has been found that in one of these kilns, maintenance of a temperature of 285° C. at a point 4 feet from the discharge end permits production of a uniform product having an iodine number of about 90, when other conditions have been properly adjusted, and are kept constant.

The location of the most critical point in the kiln for measuring temperature (and consequently the best position for the thermocouple 20, Fig. 3) generally varies somewhat for kilns of different sizes and shapes. This is because rotary kilns and like equipment vary considerably from one another, and because no single temperature is maintained throughout a kiln during operation. Instead, a temperature gradient exists, and it would be a rare coincidence if two kilns should have the same temperature gradient. However, this is not a deterrent to the practice of my invention, since the essential conditions in any kiln are substantially fixed, and the temperature gradient has a rather definite relationship to the temperature at a selected "critical" point. Furthermore, the location of the most critical point is readily determined. For example, a kiln is started into operation, and the temperature at a selected point is maintained constant, and after operations have been stabilized, the iodine number of the product resulting from operation under these conditions is determined. The temperature is changed from time to time, and the point of measurement of the temperature is also varied to secure samples of activated magnesia produced at different temperature gradients, as indicated by measurements at different points. Iodine number determinations are then run on each sample to determine the temperature gradient at which activated magnesia of maximum activity, or other desired activity, is produced. When this data has been obtained for any kiln, the kiln can readily be operated under the conditions giving the desired results by control of the temperature at a single point in the kiln. In other words, when the most desirable location for the thermocouple 20 has been established, the results from operations so conducted that a specified temperature is indicated by the thermocouple are entirely predictable.

In this connection, it should be noted that it is not always desirable to obtain a product of maximum activity. For example, in working on carotene, it has been found that a material having an iodine number of from 50 to 70 is best. Such a material frequently contains nearly 80 per cent of residual Mg(OH)₂, and about 20 per cent MgO, and may therefore be considered as essentially an active magnesium hydroxide. For other purposes, however, an adsorptive capacity corresponding to an iodine number of 90 or 100 or 145 or even more, may be most suitable, and such products usually contain much smaller amounts of residual Mg(OH)₂. The permissible water content in my activated magnesia products can thus correspond to amounts of residual Mg(OH)₂ from about 2 per cent to nearly 100 per cent.

The baking or dehydrating operation in accordance with this invention involves countercurrent desiccation, in the sense that the wet magnesia entering the kiln is subjected to contact with gases which are nearly saturated with water, while the more nearly dehydrated magnesia at the lower end of the kiln is subjected to contact with hot flame gases which are substantially dry. This makes for a uniform dehydrating action, and facilitates control, since the heat transfer is also countercurrent.

The magnesium hydroxide starting material employed in the practice of this invention is important. In one of the best ways of preparing suitable Mg(OH)₂, a substantially sulfate-free magnesium salt solution derived from a seawater bittern is treated with a CaO to precipitate Mg(OH)₂, and the precipitate is washed to remove chlorides, advantageously to less than 1 per cent, calculated as NaCl. Chlorides in excess of this amount have a deleterious effect on the activity of the final product, and substantially reduce the maximum activity obtainable. In routine operation, it is best to precipitate Mg(OH)₂ in the manner described, then wash it carefully, and feed the product to the kiln in the form of a slurry or filter cake as described.

The activated magnesias made in accordance with this invention are useful in various arts. I have employed them successfully in reconditioning used cleaning solvents, including Stoddard's solvent, and CCl₄; and also to remove sulfur compounds, including mercaptans, from petroleum fractions. The utility of the activated magnesia product is not limited to these applications, however.

What I claim is:

1. As a new article of manufacture, the decomposition product resulting from the heating of magnesium hydroxide, the product having activated physical and chemical properties and having 80 per cent to 85 per cent of the original magnesium hydroxide content converted to magnesium oxide.

2. In a method of manufacturing activated magnesium oxide, converting precipitated magnesium hydroxide to magnesium oxide under such conditions as to effect conversion of the magnesium hydroxide between the limits of about 80 per cent to 85 per cent.

3. The method of producing activated magnesium oxide comprising: heating precipitated magnesium hydroxide to a temperature in excess of 400° C., maintaining a temperature in excess of 400° C., until only a substantial portion of the magnesium hydroxide is converted to magnesium oxide and until a minor but effective portion thereof remains unconverted, for such length of time as to produce a product having an absorptive activity, when compared to magnesium oxide obtained by calcination at dull red heat of precipitated magnesium hydroxide which has been dehydrated until the magnesium hydroxide content thereof is two per cent, substantially in excess of said oxide.

4. As a new article of manufacture, a decomposition product resulting from the heating of magnesium hydroxide at a temperature of the order of 400° C. for a limited time, the product having activated physical and chemical properties and consisting largely of magnesium oxide while having a residual magnesium hydroxide content lying above 2 per cent.

5. The method of manufacturing activated magnesia which comprises heating magnesium hydroxide to convert it largely to magnesium oxide, and controlling the heating to effect conversion of the magnesium hydroxide to such extent as to yield a product having a residual content of unconverted magnesium hydroxide lying above 2 per cent.

6. The method of manufacturing activated magnesia which comprises heating precipitated magnesium hydroxide to convert it largely to magnesium oxide, and controlling the heating to effect conversion of the magnesium hydroxide to such extent as to yield a product having a residual content of unconverted magnesium hydroxide lying above 2 per cent.

7. As a new article of manufacture, a decomposition product resulting from the heating of magnesium hydroxide at a temperature of at least 400° C. for a limited time, the product having an iodin absorption number in excess of 60.

8. The method of manufacturing activated magnesium oxide which comprises converting magnesium hydroxide to a highly activated product by heating said magnesium hydroxide to a temperature of at least 400° C. for a sufficient time to raise the iodin absorption number of the product to a value in excess of 60.

9. The method of manufacturing activated magnesia which comprises converting precipitated magnesium hydroxide to a highly activated product by heating said magnesium hydroxide to a temperature of at least 400° C. for a sufficient time to raise the iodin absorption number of the product to a value in excess of 60.

10. An adsorbent material, for use as in decolorizing oils, containing about 90 per cent of MgO and the balance substantially entirely Mg(OH)₂ and having an adsorbent value of about 100 on the iodin scale.

11. A process for producing a magnesium material, said process comprising calcining a substantially pure Mg(OH)₂ for about 15 minutes at a temperature of approximately 660° C. to produce a material useful as an adsorbent, e. g. in decolorizing oils.

12. In the production of activated magnesia of high adsorbent power, the process which comprises briefly heating magnesium hydroxide to a temperature above 350° C., the time of heating and the temperature being so correlated in inverse ratio that an iodin value of 60 or higher is obtained, and quickly cooling the heated material.

13. In the process of claim 12 feeding a stream of magnesium oxide slurry through a rotary kiln, the speed of feed and heating being so correlated that the emerging magnesia has an iodine value above 60.

14. As a new adsorbent, a magnesian preparation produced by a brief baking of magnesium hydroxide at a temperature above 350° C. for a time sufficient to give an iodin value of 60.

MAX Y. SEATON.